Patented July 29, 1924.

1,503,150

UNITED STATES PATENT OFFICE.

CLARENCE J. BROCKBANK, OF PHILADELPHIA, PENNSYLVANIA, ASSIGNOR TO ROSS-TACONY CRUCIBLE COMPANY, A CORPORATION OF PENNSYLVANIA.

REFRACTORY ARTICLE AND METHOD OF MAKING THE SAME.

No Drawing.   Application filed July 24, 1923.. Serial No. 653,570.

*To all whom it may concern:*

Be it known that I, CLARENCE J. BROCKBANK, a British subject, residing at Philadelphia, in the county of Philadelphia and State of Pennsylvania, have invented a new and useful Improvement in Refractory Articles and Methods of Making the Same, of which the following is a specification.

The invention relates to improvements in and in the method of making refractory articles of which graphite is a component, and more particularly to improvements in and in the method of making clay bonded graphite articles, known as stoppers and nozzles which are used in controlling the flow of metal from steel ladles and other refractory-lined containers.

Heretofore such articles have been formed of mixtures of plastic clay and clay grog, or mixtures of flake graphite and ball clay. It is desirable that they have high resistance to deformation at the temperature of molten steel and that they resist washing or groving due to the mechanical erosion of the flowing metal, because such erosion destroys the seat of the stopper in the nozzle and results in continuous leaking of metal even when the nozzle is closed. While graphite-clay stoppers are greatly superior to the all clay article, nevertheless in the case of graphite clay stoppers washing does occur, and increased hardness at operating temperatures is highly desirable.

The principal object of my invention is to confer this increased hardness to articles of the nature described, without changing the other desirable properties of the clay-graphite mixture, such as low shrinkage, accurate form and contour which are the peculiar attributes of graphite compositions.

I have discovered that if molded articles, comprised of graphite and clay, are subjected to the action of hydrocarbon vapors during their vitrification, greatly increased hardness and resistance to mechanical deformation results which hardness is not limited to the skin, or surface layer, but extends throughout the body. The shrinkage is also reduced and the refractory properties increased.

One method for effecting this improvement may be described as follows: In the sagger or container in which such articles are vitrified in the kiln, I place a layer of firesand or other inert granular refractory, to which a small addition of liquid tar has been made. This forms the carbonizing bed. The stoppers are then packed in the sagger on the top of this layer. I may also fill the sagger with granular material completely burying the articles to be vitrified as I have found that this results in a more efficient reaction due to its retarding the escape of the volatile hydrocarbon. The saggers are sealed, either with fire-clay covers or by superimposing same in the kiln, the joints being grouted with fire-clay, and fired. During the firing the volatile gases given off by the tar are absorbed by the refractory, a chemical cracking appears to occur, depositing carbon in the pores of the material, resulting in a tight impervious body, having greatly increased hardness and refractoriness as described.

It is understood that I may use other carbonizing agents such as pitch, soft coal, and the like, without departing from the spirit of my invention which is not limited to such matters or otherwise than as the prior art and the appended claims may require.

I claim:

1. A refractory article of graphite and clay vitrified in an atmosphere of hydrocarbon gas and characterized by relatively increased hardness at high temperature and relatively increased refractory properties.

2. A vitrified graphitic clay refractory article characterized by density of structure and strength and by resistance to deformation at high temperatures and containing throughout its mass a deposit of carbon derived from hydrocarbon vapor.

3. A vitrified graphitic clay refractory article having its pores impregnated with deposit carbon.

4. In the process of making a refractory article of clay and graphite the improved step which consists in subjecting it to hydrocarbon vapor during vitrification to deposit carbon in finely divided condition throughout the mass of the article.

5. A refractory article comprising vitrified graphitic clay in intimate admixture with finely divided carbon derived from hydrocarbon vapor by cracking it.

CLARENCE J. BROCKBANK.